(No Model.)
M. H. O'BRIEN.
COMBINED TWINE HOLDER AND CUTTER.
No. 342,532. Patented May 25, 1886.
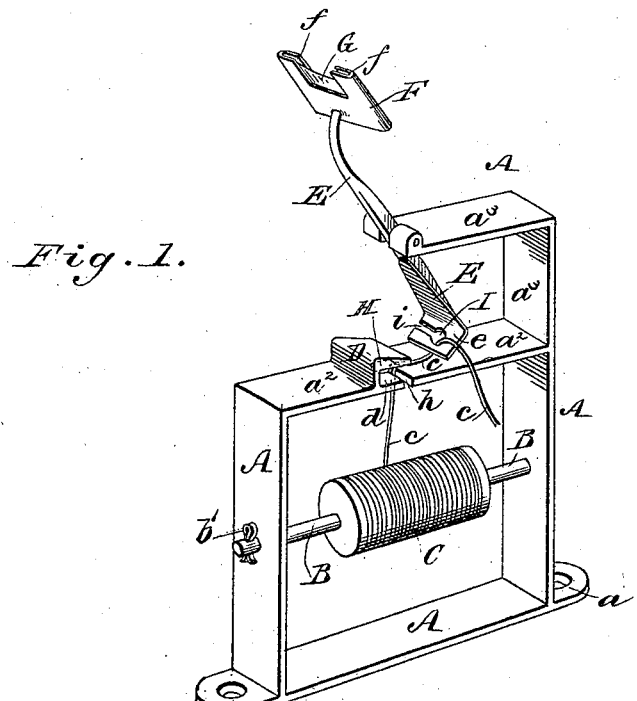
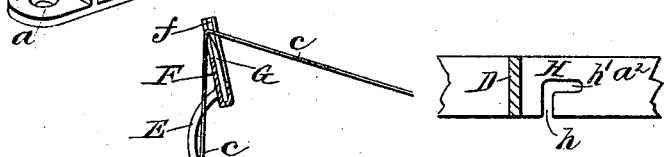
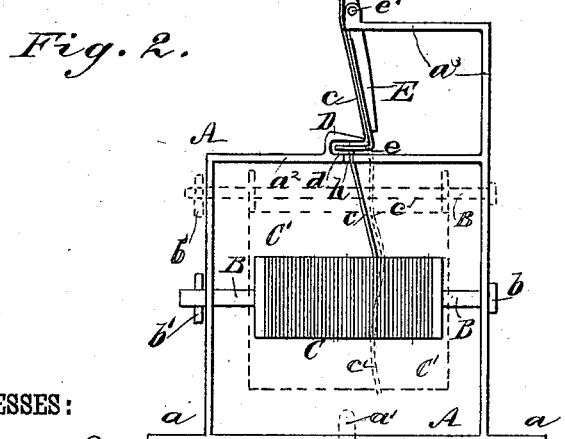
WITNESSES:
INVENTOR:
M. H. O'Brien
BY Munn & Co.
ATTORNEYS.

UNITED STATES PATENT OFFICE.

MICHAEL HENRY O'BRIEN, OF ST. IGNACE, MICHIGAN.

COMBINED TWINE HOLDER AND CUTTER.

SPECIFICATION forming part of Letters Patent No. 342,532, dated May 25, 1886.

Application filed October 22, 1885. Serial No. 180,599. (No model.)

*To all whom it may concern:*

Be it known that I, MICHAEL HENRY O'BRIEN, of St. Ignace, Mackinac county, Michigan, have invented a new and Improved Twine Holder and Cutter, of which the following is a full, clear, and exact description.

My invention relates to devices for holding twine and cutting it as it is required for use, and has for its object to provide a simple, inexpensive and effective device of this character.

The invention consists in certain novel features of construction and combination of parts of the twine holder and cutter, all as hereinafter fully described and claimed.

Reference is to be had to the accompanying drawings, forming part of this specification, in which similar letters of reference indicate corresponding parts in all the figures.

Figure 1 is a perspective view of my improved twine holder and cutter, and illustrates the manner of threading the twine into the open eyes of the frame and knife-holding lever. Fig. 2 is a front view of the device, showing how the twine is cut and how its loose end is caught and held by the knife-lever; and Fig. 3 is a detail view showing another form of slot or eye in the frame for the passage of the twine.

The letter A indicates a frame, which is made in the form shown, and preferably of metal, and which may have perforated lugs $a\ a$, through the holes of which screws or nails may be passed to hold the device to a counter or to the side of a post or wall, or overhead, and, if desired, the frame A may be pivoted on a pin, $a'$, as shown in dotted lines in Fig. 2, to allow the frame to swing around freely, for enabling persons standing in different places around the twine-holder to more conveniently unreel the twine from it.

Across the frame A, at its lower part, is fitted the rod or wire B, on which the spool C, or it may be the ball of twine $c$, is placed, said rod B having a head, $b$, at one end, and receiving a split key, $b'$, at the other end, by which head and key it is held to the frame A, and so it may readily be moved endwise in the frame when the key $b'$ is taken out, to allow new spools or balls of twine to be placed on the rod within the frame, as shown.

On the cross-bar $a^2$ of the frame A is formed or to it is fixed the hook D, thus providing a space at $d$, between the head of the hook and the frame-bar, into which space the lower bent or hook end, $e$, of the knife-holding lever E is adapted to enter, said lever E being pivoted at $e'$ to the outer end of the upper angular portion, $a^3$, of the frame A.

F indicates the knife-holding head, which is fixed to the upper end of the lever E, and is provided with bent-over lips or flanges at the sides and lower edge to form slots thereat, in which the twine-cutting knife G is held, and the side parts of the head F extend above the edge of the knife to form guards, as at $f\ f$, to prevent slipping of the twine from the knife and insure the cutting of the twine when it is pressed onto the knife.

The frame-bar $a^2$, under the head of the hook D, is provided with an eye or hole, H, (dotted in Fig. 1,) and from which eye a slot, $h$, extends to the front edge of the frame-bar, and the hook end $e$ of the lever E has an eye or hole, I, from which a slot, $i$, extends to the back edge of the lever.

The operation is as follows: After the spool or ball of twine is placed on the rod B of the holder, the loose end of the twine $c$ will first be passed through the slot $h$ of frame-bar $a^2$ into the eye H, and then the twine will be slipped through the slot $i$ of lever E into the eye I, and the loose end of the twine then may hang from the lever E, as shown in Fig. 1. When the twine is to be used, as much of it as may be required is drawn through the eye I of lever E, and the end of the twine then carried up to and over the knife G, and by pressing the twine on the knife to sever the twine the lever E will be swung so that its end $e$ will be carried beneath the head of the hook D, as shown in Fig. 2, and thereby the twine will be caught or jammed tightly between the hook end $e$ of lever E and the hook D on the frame, so that the twine is cut as its part beyond the knife G is drawn upon, and without a further unwinding of it from the spool or ball C, and the loose end of the twine then will fall, as at $c'$ in dotted lines in Fig. 2. When the twine is again to be used, this loose end $c'$ will be grasped and drawn sidewise to swing the hook end $e$ of lever E from beneath the hook D, and the twine may then be drawn freely through the eye I of the lever as it unwinds from the spool or ball.

The parts $a^2 a^3$ of the frame A, with the hook D, and the knife-holding and twine-clamping lever E e, provided with the open eyes H h I i, are the important features of the invention, and it is evident that they may be adopted with or attached to any sort of a device arranged to hold the spool or ball of twine—as, for instance, the rod B may be removed from its position shown in full lines in Fig. 2, and be passed through holes of the frame nearer the bar $a^2$, and a twine-box, C', may be suspended from the rod B, as shown in dotted lines in Fig. 2, so that twine may be used from a ball held in the box.

The eyes H h I i allow the twine to be threaded sidewise at any distance from its end, which may be done very quickly, and the twine cannot easily slip from the eyes; and it may be preferred to make the eye at H in the form of the slot h' shown in Fig. 3, wherein the round hole into which the side slot, h, opens in Fig. 1 is substituted by the slot h', extending toward and under the lever, E, which allows more free drawing of the twine through the eye of the lever.

Having thus described my invention, I claim as new and desire to secure by Letters Patent—

1. In a twine holder and cutter, a plate or support provided with an eye, as at H, and with a hook, D, arranged over said eye, and a lever, E, pivoted to a support beyond the hook D, and provided with a knife, G, at its outer end, and provided at its inner end with a hook, e, having an eye, as at I, and adapted to clamp the twine threaded through the eyes H I against the hook D when the twine is cut upon the knife G, substantially as herein set forth.

2. In a twine cutter and holder, a plate or support provided with an eye, as at H, and a slot, h, opening into said eye from the front edge of the support, and provided also with a hook, D, arranged above said open eye H h, and a lever, E, pivoted to a support beyond the hook D, and provided with a knife, G, at its upper end, and with a hook end, e, having an eye, I, and a slot, i, opening into said eye from the back edge of the hook e, all constructed and arranged for operation, substantially as herein set forth.

3. A twine holder and cutter comprising a frame, A, provided with a spool-shaft, B, a hook, D, and an upper part or arm, $a^3$, and a lever, E, pivoted to arm $a^3$, and provided with a twine-cutting knife at one end, and at its other end with a hook, e, adapted to enter the frame-hook D, substantially as specified, whereby the twine held in frame A and lever-hook e will be clamped when the twine is cut on the lever-knife, substantially as herein set forth.

MICHAEL HENRY O'BRIEN.

Witnesses:
RICHARD WALCH,
GRANVILLE W. BOYNTON.